(12) United States Patent
Naoi

(10) Patent No.: US 8,349,467 B2
(45) Date of Patent: Jan. 8, 2013

(54) METAL NANOWIRES, METHOD FOR PRODUCING THE SAME, AND AQUEOUS DISPERSION THEREOF

(75) Inventor: Kenji Naoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 422 days.

(21) Appl. No.: 12/398,355

(22) Filed: Mar. 5, 2009

(65) Prior Publication Data
US 2009/0226753 A1 Sep. 10, 2009

(30) Foreign Application Priority Data

Mar. 10, 2008 (JP) ................................ 2008-059527

(51) Int. Cl.
*B22F 1/02* (2006.01)

(52) U.S. Cl. ............ 428/558; 75/351; 75/371; 428/606; 428/673; 977/762; 977/896

(58) Field of Classification Search .................. 148/430; 420/505; 977/762; 75/351, 371
See application file for complete search history.

(56) References Cited

U.S. PATENT DOCUMENTS

| 7,132,275 | B2 * | 11/2006 | Reich et al. ................. 435/287.1 |
| 7,849,424 | B2 * | 12/2010 | Wolk et al. ..................... 716/117 |
| 7,922,787 | B2 * | 4/2011 | Wang et al. ...................... 75/371 |
| 8,052,773 | B2 * | 11/2011 | Takada ............................ 75/371 |
| 2005/0056118 | A1 | 3/2005 | Xia et al. |
| 2007/0074316 | A1 | 3/2007 | Alden et al. |

FOREIGN PATENT DOCUMENTS

| JP | 2001-279304 A | | 10/2001 |
| JP | 2004-196923 A | | 7/2004 |
| JP | 2008-013798 A | | 1/2008 |
| JP | 2009-120867 A | | 6/2009 |
| JP | 2009-127092 A | * | 6/2009 |

OTHER PUBLICATIONS

Japanese Office Action dated Jan. 24, 2012 corresponding to Japanese Application No. 2008-059527.

* cited by examiner

*Primary Examiner* — George Wyszomierski
(74) *Attorney, Agent, or Firm* — Sughrue Mion, PLLC

(57) ABSTRACT

The present invention provides metal nanowires including at least silver, and a metal other than silver, wherein the metal other than silver has a standard electrode potential more positive than the standard electrode potential of silver, and the metal nanowires have a long-axis length of 1 μm or more and a short-axis length of 300 nm or less.

7 Claims, No Drawings

METAL NANOWIRES, METHOD FOR PRODUCING THE SAME, AND AQUEOUS DISPERSION THEREOF

BACKGROUND OF THE INVENTION

1. Field of the Invention

The present invention relates to metal nanowires from which a transparent low-resistance conductive layer can be formed without the aid of antioxidants, a method for producing the metal nanowires, and an aqueous dispersion thereof.

2. Description of the Related Art

As a method for producing an aqueous dispersion of metal nanowires with a long-axis length of 1 µm or more and a short-axis length of 100 nm or less, a method is proposed in which a polyol dispersion of silver nanowire is prepared by a polyol process, and a solvent contained in the polyol dispersion is substituted with water through centrifugation to thereby produce an aqueous dispersion of metal nanowires (see U.S. Published Patent Application No.2005/0056118 and U.S. Published Patent Application No. 2007/0074316).

Furthermore, U.S. Published Patent Application No. 2007/0074316 and Japanese Patent Application Laid-Open (JP-A) No. 2004-196923 propose a transparent conductor made of metal nanowires. In practical use of metal nanowires, the resistance is disadvantageously increased because of oxidation of Ag. In order to prevent the increase of the resistance, an antioxidant is added to metal nanowires or an overcoat layer is applied on metal nanowires. However, since the antioxidants or the overcoat layers used in the above-mentioned metal nanowires are not conductive and their effects do not last permanently because their materials are organic substances, further improvements of metal nanowires are desired at present.

BRIEF SUMMARY OF THE INVENTION

An object of the present invention is to provide metal nanowires whose transparency and conductivity can be maintained and from which a transparent conductor can be formed, a method for producing the metal nanowires, and an aqueous dispersion of the metal nanowires which is capable of improving its storage stability and dispersion stability after applied coat.

Measures for solving the above problems are as follows:

<1> Metal nanowires including at least silver, and a metal other than silver, wherein the metal other than silver has a standard electrode potential more positive than the standard electrode potential of silver, and the metal nanowires have a long-axis length of 1 µm or more and a short-axis length of 300 nm or less.

<2> The metal nanowires according to the item <1>, wherein the amount of the metal other than silver in the metal nanowires is 0.5 atomic % to 30 atomic % to the amount of the silver.

<3> The metal nanowires according to the item <1>, wherein the metal other than silver is at least one selected from the group consisting of gold, palladium, iridium, platinum, and osmium.

<4> A method for producing metal nanowires, including at least adding an aqueous solution of a salt of a metal other than silver to an aqueous dispersion of silver nanowires to initiate an oxidation-reduction reaction, and desalting the reaction product, wherein the metal nanowires include at least silver, and a metal other than silver, and wherein the metal other than silver has a standard electrode potential more positive than the standard electrode potential of silver, and the metal nanowires have a long-axis length of 1 µm or more and a short-axis length of 300 nm or less.

<5> The method for producing metal nanowires according to the item <4>, wherein the metal other than silver is produced through reduction by silver.

<6> An aqueous dispersion including at least metal nanowires, wherein the metal nanowires comprise silver, and a metal other than silver, the metal other than silver has a standard electrode potential more positive than the standard electrode potential of silver, and the metal nanowires have a long-axis length of 1 µm or more and a short-axis length of 300 nm or less.

<7> The aqueous dispersion according to the item <6>, wherein the metal nanowires contain metal nanowires whose long-axis length is 10 µm or more in an amount of 0.01% by mass or more.

<8> A transparent conductor including at least a transparent conductive layer which is formed by an aqueous dispersion which includes metal nanowires, wherein the metal nanowires contain silver, and a metal other than silver, the metal other than silver has a standard electrode potential more positive than the standard electrode potential of silver, and the metal nanowires have a long-axis length of 1 µm or more and a short-axis length of 300 nm or less.

According to the present invention, the problems of the prior arts can be solved, while metal nanowires whose transparency and conductivity can be maintained and from which a transparent conductor can be formed, a method for producing the metal nanowires, an aqueous dispersion of the metal nanowires which is capable of improving its storage stability and dispersion stability after applied coat, and a transparent conductor can be provided.

DETAILED DESCRIPTION OF THE INVENTION (Metal Nanowires)

Metal nanowires of the present invention include silver and a metal other than silver which has a standard electrode potential that is more positive than the standard electrode potential of silver.

The metal nanowires have a long-axis length of 1 µm or more and a short-axis length of 300 nm or less.

The shape of each metal nanowire is not particularly limited, can be appropriately selected depending on the purpose, and may be any shape such as a cylindrical columnar shape, a rectangular parallelepiped shape, or a columnar shape with a polygonal cross-section.

The long-axis length of the metal nanowires is 1 µm or more, preferably 5 µm or more, and more preferably 10 µm or more. The short-axis length of the metal nanowires is 300 nm or less, preferably 250 nm or less, and more preferably 200 nm or less. When the long-axis length of the metal nanowires is less than 1 µm, a transparent conductor, which is produced by applying an aqueous dispersion of the metal nanowires, may experience poor conduction due to a reduction in the number of junction points between metal elements, resulting in high resistance. Meanwhile, when the short-axis length of the metal nanowires is more than 300 nm, the transparent conductor disadvantageously shows conspicuous haze due to light scattering and becomes opaque, though the conductivity and storage stability of the transparent conductor are primarily improved.

The mean long-axis length and the mean short-axis length of the metal nanowires can be measured, for example, by a transmission electron microscope (TEM).

A metal other than silver, which forms the metal nanowires, is not particularly limited and can be appropriately selected depending on the purpose, so long as the metal other than silver has a standard electrode potential more positive than the standard electrode potential of silver; examples thereof include gold, palladium, iridium, platinum, and osmium. Among these, palladium, iridium, gold, and platinum are particularly preferred. The standard electrode potentials of the metals can be referred to those described in "*Kagaku Binran Kaitei* 5 *Han Kiso Hen II* (Manual for Chemistry 5th edition (revised), Basic II), pp. 581 to 584". Since the standard electrode potential differs even among the compounds containing the same metal depending on the types of the compounds and coexisting chemical species, an appropriate standard electrode potential can be chosen and used depending on the metal species.

In terms of conductivity and dispersion stability, the amount of the metal other than silver in the metal nanowires is preferably 0.5 atomic % to 30 atomic %, and more preferably 1.0 atomic % to 25 atomic % to the amount of silver. When the amount of the metal other than silver is more than 30 atomic %, reduction of conductivity, or degradation of transparency of the resulting conductor may occur. When the amount of the metal other than silver is less than 0.5 atomic %, storage stability may be disadvantageously degraded.

The amount of each metal atom in the metal nanowires can be measured, for example, by applying inductively coupled plasma (ICP) to samples that have been dissolved in an acid.

The composition of the metal other than silver is not particularly limited and can be appropriately selected depending on the purpose; examples thereof include simple substances, oxides, inorganic salts described later, and organic compounds formed from the metal and an organic acid (or a salt of an organic acid).

A metal other than silver may be contained in a metal nanowire or may cover a metal nanowire. More preferably, a metal other than silver covers a metal nanowire. When a metal nanowire is covered by a metal other than silver, the metal other than silver does not necessary cover the entire surface of the core silver or core silver alloy of the metal nanowire but a portion of them.

In the present invention, the mean wire sizes (i.e. the long-axis length and the short-axis length) of the metal nanowires and the amount of a metal other than silver in the metal nanowires can be controlled by appropriately selecting the concentrations of metal salts, inorganic salts, and organic acids (or salts thereof); the type of a solvent for particle formation; the concentration of a reducing agent; the addition rate of each reagent; and the temperature, which are specified in the "production method of the metal nanowires" described below.

(Production Method of Metal Nanowires)

A method for producing metal nanowires of the present invention is a method for producing the metal nanowires of the present invention, and includes at least adding an aqueous solution of a salt of a metal other than silver to an aqueous dispersion of silver nanowires to initiate an oxidation-reduction reaction, and further desalting the reaction product.

Preferably, a metal other than silver is produced through reduction by silver.

The reduction reaction is carried out by heating a solvent in which the silver nanowires and a salt of a metal other than silver are contained. In the heated solution, the salt of a metal other than silver is reduced by silver. Furthermore, a photoreduction process, a process for adding a reducing agent, and a chemical reduction process may be appropriately used in combination with the above reduction process depending on the purpose.

The solvent can be heated using an oil bath, aluminum block heater, hot plate, oven, infrared heater, heat roller, steam (hot air), ultrasonic wave, or microwave, etc. The heating temperature is preferably 35° C. to 200° C., and more preferably 45° C. to 180° C.

Examples of the photoreduction process include process exposing the solvent to ultraviolet ray, visible light, electron beam, and infrared ray.

Examples of the reducing agent used in the process for adding a reducing agent include hydrogen gas, sodium borohydride, lithium borohydride, hydrazine, ascorbic acid, amines, thiols, and polyols. For the chemical reduction process, electrolysis may be used.

The type of a salt for a metal other than silver is not particularly limited and can be appropriately selected depending on the purpose; examples thereof include nitrate salts, chloride salts, phosphoric salts, sulfate salts, tetrafluoroborates, ammine complexes, chloro complexes, and organic acid salts. Among them, nitrate salts, tetrafluoroborates, ammine complexes, chloro complexes and organic acid salts are particularly preferred, since these show high solubility in water.

The organic acid and organic acids forming the organic acid salts are not particularly limited and can be appropriately selected depending on the purpose. Examples thereof include acetic acid, propionic acid, citric acid, tartaric acid, succinic acid, butyric acid, fumaric acid, lactic acid, oxalic acid, glycolic acid, acrylic acid, ethylenediaminetetraacetic acid, iminodiacetic acid, nitrilotriacetic acid, glycol ether diaminetetraacetic acid, ethylenediaminedipropionic acid, ethylenediaminediacetic acid, diaminopropanol tetraacetic acid, hydroxyethyliminodiacetic acid, nitrilotrimethylenephosphonic acid and bis(2-ethylhexyl)sulfosuccinic acid. These may be used alone or in combination. Particularly, organic carboxylic acids and salts thereof are preferred.

Examples of the organic acid salts include alkali metal-organic acid salts and organic acid-ammonium salts, with organic acid-ammonium salts being particularly preferred.

The aqueous dispersion preferably contains the organic acid or a salt thereof in an amount of 0.01% by mass to 10% by mass, more preferably 0.05% by mass to 5% by mass, relative to the total solid content thereof. When the content is less than 0.01% by mass, the dispersion stability may be degraded; whereas when the content is more than 10% by mass, the conductivity and durability may be decreased.

The organic acid (or a salt thereof) content can be measured through, for example, thermogravimetry (TG).

An aqueous solution of a salt of a metal other than silver may contain a water-miscible organic solvent described later.

After the metal nanowires are formed, the desalting treatment can be carried out using such techniques as ultrafiltration, dialysis, gel filtration, decantation, and centrifugation.

(Aqueous Dispersion)

An aqueous dispersion of the present invention contains the metal nanowires of the present invention in the dispersion solvent.

The amount of the metal nanowires of the present invention in the aqueous dispersion is preferably 0.1% by mass to 99% by mass, and more preferably 0.3% by mass to 95% by mass. When the amount of the metal nanowires in the aqueous dispersion is less than 0.1% by mass, an excessive amount of load is applied on the metal nanowires in drying during the production process. When the amount of the metal nanowires in the aqueous dispersion is more than 99% by mass, particles may be readily aggregated.

In this case it is particularly preferable for the aqueous dispersion to include metal nanowires having a long-axis length of 10 μm or more in an amount of 0.01% by mass or more, and more preferably in an amount of 0.05% by mass or more, in terms of achieving both excellent transparency and conductivity, thereby the conductivity of the resulting conductor can be increased with a smaller amount of applied coat thereof.

The dispersion solvent for forming the aqueous dispersion of the present invention is mostly water. Alternatively, the dispersion solvent may be a mixture of water and a water-miscible organic solvent in an amount of 50 vol. % or less.

The organic solvent is preferably an alcohol compound having a boiling point of 50° C. to 250° C., more preferably 55° C. to 200° C. When such an alcohol compound is used in combination with water, improvement of application of coat of the aqueous dispersion and reduction of amount of load in drying may be achieved.

The alcohol compound is not particularly limited and can be appropriately selected depending on the purpose. Examples thereof include methanol, ethanol, ethylene glycol, diethylene glycol, triethylene glycol, polyethylene glycol 200, polyethylene glycol 300, glycerin, propylene glycol, dipropylene glycol, 1,3-propanediol, 1,2-butanediol, 1,4-butanediol, 1,5-pentanediol, 1-ethoxy-2-propanol, ethanolamine, diethanolamine, 2-(2-aminoethoxy)ethanol and 2-dimethylaminoisopropanol. Among them, ethanol and ethylene glycol are preferred. These may be used alone or in combination.

Preferably, the aqueous dispersion of the present invention contains no inorganic ions such as alkali metal ions, alkaline earth metal ions and halide ions.

The aqueous dispersion has an electrical conductivity of preferably 1 mS/cm or less, more preferably 0.1 mS/cm or less, still more preferably 0.05 mS/cm or less.

The aqueous dispersion has a viscosity at 20° C. of preferably 0.5 mPa·s to 100 mPa·s, and more preferably 1 mPa·s to 50 mPa·s.

If necessary, the aqueous dispersion of the present invention may contain various additives such as a surfactant, a polymerizable compound, an antioxidant, an anti sulfurizing agent, a rust retardant, a viscosity adjuster, and a preservative.

The rust retardant is not particularly limited, can be appropriately selected depending on the purpose, and is preferably one of azoles. Examples of the azoles include at least one selected from the group consisting of benzotriazole, tolyltriazole, mercaptobenzothiazole, mercaptobenzotriazole, mercaptobenzotetrazole, (2-benzothiazolylthio)acetic acid, 3-(2-benzothiazolylthio)propionic acid, an alkali metal salt thereof, an ammonium salt thereof, and an amine salt thereof. A more excellent rust-retarding effect can be expected to occur in the aqueous dispersion containing a rust retardant. The rust retardant may be directly added into the aqueous dispersion as a solution in an appropriate solvent or as a powder, or may be provided for a transparent conductor described below, after it has been produced, by dipping the transparent conductor in a bath of a solution of the rust retardant.

The aqueous dispersion of the present invention may be suitably used as an aqueous ink for an inkjet printer or dispenser.

A base material, on which the aqueous dispersion is applied in image formation by an inkjet printer, includes, for example, paper, coated paper, and a PET film whose surface is coated with, for example, a hydrophilic polymer.

(Transparent Conductor)

A transparent conductor used in the present invention contains a transparent conductive layer formed by the aqueous dispersion of the present invention. The transparent conductor is produced by applying the aqueous dispersion of the present invention on a base material and drying the aqueous dispersion.

Details of the transparent conductor used in the present invention are specified below through the description of a method for producing the transparent conductor.

The base material on which the aqueous dispersion is applied is not particularly limited and can be appropriately selected depending on the purpose. Examples of the base material for a transparent conductor include the following. Among them, a polymer film is preferred, and a PET film and a TAC film are particularly preferred in terms of production suitability, lightweight properties, and flexibility.

(1) glass such as quartz glass, alkali-free glass, transparent crystallized glass, PYREX (registered trademark) glass, and sapphire, (2) acrylic resins such as polycarbonate and polymethyl mathacrylate; vinyl chloride resins such as polyvinyl chloride and vinyl chloride copolymers; and thermoplastic resins such as polyarylate, polysulfone, polyethersulfone, polyimide, PET, PEN, fluorine resins, phenoxy resins, polyolefine resins, nylon, styrene resins and ABS resins, and (3) thermosetting resins such as epoxy resins.

As desired, the above-mentioned base materials may be used in combination. Using base materials appropriately selected from the above depending on the intended application, a flexible or rigid base material having a shape of film, etc. can be formed.

The base material may have any shape such as a disc shape, a card shape or a sheet shape. Also, the base material may have a three-dimensionally laminated structure. Further, the base material may have fine pores or grooves with aspect ratios of 1 or more in a portion where the printed wiring is formed, and the aqueous dispersion of the present invention may be discharged thereinto using an inkjet printer or dispenser.

The base material is preferably treated to be given hydrophilicity to the surface thereof. Also, a hydrophilic polymer is preferably applied on the base material surface. Such treatments allow the aqueous dispersion to be readily applied on the base material with improved adhesion.

The above hydrophilication treatment is not particularly limited and can be appropriately selected depending on the purpose. The hydrophilication treatment employs, for example, chemicals, mechanical roughening, corona discharge, flames, UV rays, glow discharge, active plasma or laser beams. Preferably, the surface tension of the base material surface is adjusted to 30 dyne/cm or more through this hydrophilication treatment.

The hydrophilic polymer which is applied on the base material surface is not particularly limited and can be appropriately selected depending on the purpose. Examples thereof include gelatin, gelatin derivatives, casein, agar, starch, polyvinyl alcohol, polyacrylic acid copolymers, carboxymethyl cellulose, hydroxyethyl cellulose, polyvinylpyrrolidone, and dextran.

The thickness of the hydrophilic polymer layer is preferably 0.001 μm to 100 μm, more preferably 0.01 μm to 20 μm (in a dried state).

Preferably, a hardener is incorporated into the hydrophilic polymer layer to increase its film strength. The hardener is not particularly limited and can be appropriately selected depending on the purpose. Examples thereof include aldehyde compounds such as formaldehyde and glutaraldehyde; ketone compounds such as diacetyl ketone and cyclopentanedione; vinylsulfone compounds such as divinylsulfone; triazine compounds such as 2-hydroxy-4,6-dichloro-1,3,5- triazine; and isocyanate compounds described in, for example, U.S. Pat. No. 3,103,437.

The hydrophilic polymer layer can be formed as follows: the above hydrophilic compound is dissolved or dispersed in an appropriate solvent (e.g., water) to prepare a coating liquid; and using a coating method such as spin coating, dip coating, extrusion coating, bar coating or die coating, the thus-prepared coating liquid is applied on a base material surface which had undergone a hydrophilication treatment. If necessary, an undercoat layer may be provided between the base material and the hydrophilic polymer layer for improving adhesiveness therebetween. The temperature at which the hydrophilic polymer is dried is preferably 120° C. or less, and more preferably 30° C. to 100° C.

In the present invention, the formed transparent conductor is preferably dipped in a bath of a solution of a rust retardant, and thereby given a more excellent rust-retarding effect.

-Application of Use-

The transparent conductor used in the present invention will be widely used in, for example, touch panels, antistatic materials for displays, electromagnetic shielding materials, electrodes for organic or inorganic EL displays, other kinds of electrodes or antistatic materials for flexible displays, electrodes for solar batteries, and various devices.

EXAMPLES

The present invention will next be described by way of examples, which should not be construed as limiting the present invention thereto.

In the following Examples and Comparative Examples, "the mean particle diameter (the long-axis length and the short-axis length) of metal nanowires", "the amounts of silver and a metal other than silver in metal nanowires", and "the viscosity of the aqueous dispersion", as well as "the transmittance of the coating materials" and "the resistivity of the coating materials on surfaces" are measured as follows.

<Mean Particle Diameter (Long-axis Length and Short-axis Length) of Metal Nanowires>

The mean particle diameter of metal nanowires was measured through observation of TEM images using a transmission electron microscope (TEM) (JEM-2000FX, manufactured by JEOL Ltd.).

<The Amounts of Silver and a Metal Other than Silver in Metal Nanowires>

The amounts of silver and a metal other than silver in metal nanowires were measured using inductively coupled plasma (ICP) (ICPS-1000IV, manufactured by Shimadzu Corporation).

<Viscosity of Aqueous Dispersion>

The viscosity of aqueous dispersions was measured at 25° C. using a viscometer (VISCOMATE VM-1G, manufactured by CBC Materials Co., Ltd.).

Example 1

<Preparation of Aqueous Dispersion of Metal Nanowires>
-Preparation of Sample 101-

Ethylene glycol (30 mL) was put in a three-necked flask and heated at 160° C. Subsequently, 18 mL of an ethylene glycol solution containing PVP (K-30) (36 mM), iron acetylacetonate (3 μM), and sodium chloride (60 μM), and 18 mL of an ethylene glycol solution containing silver nitrate (24 mM) were added into ethylene glycol in the three-necked flask at a rate of 1 mL/min. The mixture was heated at 160° C. for 60 min, and then cooled to room temperature. The resulting mixture was diluted with water, centrifuged, and purified until the conductivity reached 50 μS/cm or less to prepare an aqueous dispersion. The silver nanoparticles thus obtained were in the shape of a wire having a short-axis length of 50 nm to 110 nm and a long-axis length of 10 μm to 60 μm.

The amount of silver in the aqueous dispersion of silver nanowires thus obtained was 22% by mass. It was found that the thus-obtained dried aqueous dispersion, after it had been dried, was reduced in mass by 1.8% after heating to 550° C. by an analysis through thermogravimetry (TG) (THERMO PLUS2, manufactured by Rigaku Corporation). This aqueous dispersion was designated as sample 101. The metal nanowires of sample 101 thus obtained had a short-axis length of 50 nm to 110 nm and a long-axis length of 10 μm to 60 μm.

-Preparation of Sample 102-

In the adding step of the preparation of sample 101, 0.01M aqueous solution of palladium nitrate was additionally added to ethylene glycol such that the amount of palladium reached 0.05 atomic % to the amount of silver. The resulting mixture was heated at 90° C. for one hour, cooled to room temperature, and then purified with water until the conductivity reached 50 μS/cm or less. The aqueous dispersion thus obtained was designated as sample 102.

The metal nanowires of sample 102 thus obtained had a short-axis length of 50 nm to 106 nm and a long-axis length of 9 μm to 59 μm.

-Preparation of Sample 103-

In the adding step of the preparation of sample 101, 0.01M aqueous solution of palladium nitrate was additionally added to ethylene glycol such that the amount of palladium reached 0.6 atomic % to the amount of silver. The resulting mixture was heated at 90° C. for one hour, cooled to room temperature, and then purified with water until the conductivity reached 50 μS/cm or less. The aqueous dispersion thus obtained was designated as sample 103.

The metal nanowires of sample 103 thus obtained had a short-axis length of 49 nm to 110 nm and a long-axis length of 9 μm to 58 μm.

-Preparation of Sample 104-

In the adding step of the preparation of sample 101, 0.01M aqueous solution of palladium nitrate was additionally added to ethylene glycol such that the amount of palladium reached 12 atomic % to the amount of silver. The resulting mixture was heated at 90° C. for one hour, cooled to room temperature, and then purified with water until the conductivity reached 50 μS/cm or less. The aqueous dispersion thus obtained was designated as sample 104.

The metal nanowires of sample 104 thus obtained had a short-axis length of 50 nm to 107 nm and a long-axis length of 10 μm to 59 μm.

-Preparation of Sample 105-

In the adding step of the preparation of sample 101, 0.01M aqueous solution of palladium nitrate was additionally added to ethylene glycol such that the amount of palladium reached 28 atomic % to the amount of silver. The resulting mixture was heated at 90° C. for one hour, cooled to room temperature, and then purified with water until the conductivity reached 50 μS/cm or less. The aqueous dispersion thus obtained was designated as sample 105.

The metal nanowires of sample 105 thus obtained had a short-axis length of 49 nm to 112 nm and a long-axis length of 8 μm to 58 μm.

-Preparation of Sample 106-

In the adding step of the preparation of sample 101, 0.01M aqueous solution of palladium nitrate was additionally added to ethylene glycol such that the amount of palladium reached 34 atomic % to the amount of silver. The resulting mixture was heated at 90° C. for one hour, cooled to room temperature, and then purified with water until the conductivity reached 50 μS/cm or less. The aqueous dispersion thus obtained was designated as sample 106.

The metal nanowires of sample 106 thus obtained had a short-axis length of 46 nm to 106 nm and a long-axis length of 8 μm to 54 μm.

-Preparation of Sample 107-

In the preparation of sample 101, the solvent was replaced by ethanol, and then a solution of dodecane thiol ethanol (0.02 M) (thiol solution) was added to the mixture. Subsequently the solvent of the resulting mixture was further replaced by water to prepare an aqueous dispersion, which was designated as sample 107.

The metal nanowires of sample 107 thus obtained had a short-axis length of 50 nm to 110 nm and a long-axis length of 10 μm to 60 μm.

-Preparation of Sample 108-

In the preparation of sample 101, an aqueous solution of PVP (K-30) was added such that the dry mass of PVP became equal to the mass of silver in the aqueous dispersion thus prepared. The aqueous dispersion was designated as sample 108.

The metal nanowires of sample 108 thus obtained had a short-axis length of 50 nm to 110 nm and a long-axis length of 10 μm to 60 μm.

The viscosity of each of the aqueous dispersions thus obtained was measured and all of the viscosities were 10 mPa·s or less (25° C.). Furthermore, analysis of each of the aqueous dispersions through XRD (RINT2500, manufactured by Rigaku Corporation) revealed that each of the diffractive patterns was the diffractive pattern of silver metal.

Next, a commercially available biaxially stretched, heat set polyethylene terephthalate (PET) base material (thickness: 100 μm) was corona-discharged at 8 W/m²·min. Separately, an undercoat layer-composition was prepared by adding hexamethylene-1,6-bis(ethyleneurea) in an amount of 0.5% by mass to copolymer latex formed of butyl acrylate (40% by mass), styrene (20% by mass), and glycidyl acrylate (40% by mass). The thus-prepared composition was applied on the corona-discharged base material to form an undercoat layer with a thickness of 0.8 μm (in a dried state).

Subsequently, the surface of the undercoat layer was corona-charged at 8 W/m²·min, and then hydroxyethyl cellulose was applied on the charged surface to form a hydrophilic polymer layer with a thickness of 0.2 μm (in a dried state).

Then, each aqueous dispersion of samples 101 to 108 was applied on the hydrophilic polymer layer using Doctor coater and dried. The amount of applied silver was adjusted so that the amount was 0.02 g/m² as measured by an X-ray fluorescence spectrometer (SEA1100, manufactured by Seiko Instruments Inc.).

Properties of the applied coat thus obtained were evaluated as follows. The results are shown in Table 1.

<Transmittance of Applied Coat>

The transmittance of the applied coat was measured at 400 nm to 800 nm using UV-2550, manufactured by Shimadzu Corporation.

<Surface Resistivity of Applied Coat>

The resistivity of a surface of the applied coat was measured using LORESTA-GP MCP-T600, manufactured by Mitsubishi Chemical Corporation.

<Stability of Aqueous Dispersion>

Each of the aqueous dispersions was stirred by a magnetic stirrer, transferred into a transparent acrylic column with a side length of 5 cm and a height of 30 cm, and then allowed to stand still for 3 hr at room temperature. A liquid at a depth of 2 cm from the dispersion surface was sampled and measured by ultraviolet-visible transmission absorption spectrometry (UV-2550, manufactured by Shimadzu Corporation) for evaluating the dispersion stability thereof. The transmittance of an optical cell charged with water was used as a baseline and taken as 100%. Samples with high dispersion stability had a low transmittance even at a depth near the dispersion surface, and samples with low dispersion stability caused considerable sedimentation, leading to a high transmittance of a sample at a depth near the dispersion surface.

Evaluation criteria for the stability of aqueous dispersion are as follows. In the evaluation criteria, the larger the number of evaluation criterion, the more excellent the stability of the aqueous dispersion is.

[Evaluation Criteria]

1. Transmittance was 90% or more, caused significant sedimentation, problematic in practical use
2. Transmittance was 70% to less than 90%, caused recognizable sedimentation, problematic in practical use
3. Transmittance was 50% to less than 70%, caused some amount of sedimentation, no problem in practical use
4. Transmittance was 30% to less than 50%, caused little sedimentation, no problem in practical use
5. Transmittance was 0% to less than 30%, caused no recognizable sedimentation, no problem in practical use <Storage Stability of Applied Coat>

Samples of applied coat were prepared in the same way as in the above-mentioned method using aqueous dispersions of samples 101 to 108. The samples were allowed to stand still for two weeks in an atmosphere having a temperature of 60° C. and an RH of 80%, and then the surface resistivities of the samples were measured for comparison of storage stability of applied coats.

TABLE 1

| Sample | Composition | Transmittance (%) | Surface resistivity immediately after production (ohms/square) | Surface resistivity after a lapse of time (ohms/square) | Stability of dispersion | |
|---|---|---|---|---|---|---|
| 101 | Solely Ag | 81 | 105 | 1900 | 2 | Comp. Ex. |
| 102 | Ag—Pd (0.05 atomic %) | 81 | 99 | 310 | 3 | Present Invention |
| 103 | Ag—Pd (0.6 atomic %) | 80 | 100 | 103 | 4 | Present Invention |
| 104 | Ag—Pd (12 atomic %) | 82 | 97 | 104 | 4 | Present Invention |

TABLE 1-continued

| Sample | Composition | Transmittance (%) | Surface resistivity immediately after production (ohms/square) | Surface resistivity after a lapse of time (ohms/square) | Stability of dispersion | |
|---|---|---|---|---|---|---|
| 105 | Ag—Pd (28 atomic %) | 81 | 110 | 106 | 4 | Present Invention |
| 106 | Ag—Pd (34 atomic %) | 74 | 190 | 197 | 3 | Preset Invention |
| 107 | Ag-thiol | 82 | 8700 | 9100 | 3 | Comp. Ex. |
| 108 | Ag-PVP | 79 | $5 \times 10^6$ | $>10^7$ | 5 | Comp. Ex. |

It is seen in the results of Table 1 that samples 102 to 106 of the present invention were improved in storage stability after applied coat and further in dispersion stability in a state of solution while maintaining both excellent transparency and excellent conductivity.

In addition, the applied coat of sample 104 was dipped into an aqueous solution of benzotriazole (0.2% by mass), washed with pure water, and dried to prepare another applied coat. Thus prepared applied coat was on the level equivalent to that of the applied coat of sample 104 in terms of transmittance and conductivity (immediately after production, or after a laps of time) as evaluated in the same way as above. Furthermore, still another sample was prepared in the same way as sample 104 except that palladium nitrate was changed to sodium chloroaurate or sodium chloroplatinate. The still another sample was found to have similar results to those of sample 104.

Comparative Example 1

According to the method described in Examples 1 to 4 and 8 of U.S. Published Patent Application No. 2007/0074316, silver nanowires, an aqueous dispersion, and a film of applied coat were prepared.

The silver nanowires thus obtained had a short-axis length of 60 nm to 200 nm and a long-axis length of several micrometers to 40 μm.

The applied coat thus obtained had an excellent conductivity as shown in its surface resistivity of several hundreds ohms/square, however, it caused a significant amount of sedimentation of the dispersion and the surface resistivity of the applied coat was 3400 ohms/square after a same length of laps of time as in Example 1 under the same conditions.

The metal nanowires and aqueous dispersions thereof according to the present invention will be widely used in, for example, touch panels, antistatic materials for displays, electromagnetic shielding materials, electrodes for organic or inorganic EL displays, other kinds of electrodes or antistatic materials for flexible displays, electrodes for solar batteries, and various devices.

What is claimed is:

1. Metal nanowires comprising:
   silver, and
   a metal other than silver,
   wherein the metal other than silver has a standard electrode potential more positive than the standard electrode potential of silver, the metal nanowires have a long-axis length of 1 μm or more and a short-axis length of 300 nm or less, and the metal nanowires have a structure such that the metal other than silver covers an entire surface or a portion of a core silver or a core silver alloy.

2. The metal nanowires according to claim 1, wherein the amount of the metal other than silver in the metal nanowires is 0.5 atomic % to 30 atomic % to the amount of silver.

3. The metal nanowires according to claim 1, wherein the metal other than silver is at least one selected from the group consisting of gold, palladium, iridium, platinum, and osmium.

4. A method for producing metal nanowires, comprising:
   adding an aqueous solution of a salt of a metal other than silver to an aqueous dispersion of silver nanowires to initiate an oxidation-reduction reaction, and
   desalting the reaction product,
   wherein the metal nanowires comprise silver, and a metal other than silver, and
   wherein the metal other than silver has a standard electrode potential more positive than the standard electrode potential of silver, the metal nanowires have a long-axis length of 1 μm or more and a short-axis length of 300 nm or less, and the metal nanowires have a structure such that the metal other than silver covers an entire surface or a portion of a core silver or a core silver alloy.

5. The method for producing metal nanowires according to claim 4, wherein the metal other than silver is produced through reduction by silver.

6. An aqueous dispersion comprising:
   metal nanowires,
   wherein the metal nanowires comprise silver, and a metal other than silver, the metal other than silver has a standard electrode potential more positive than the standard electrode potential of silver, the metal nanowires have a long-axis length of 1 gm or more and a short-axis length of 300 nm or less, and the metal nanowires have a structure such that the metal other than silver covers an entire surface or a portion of a core silver or a core silver alloy.

7. The aqueous dispersion according to claim 6, wherein the metal nanowires contain metal nanowires whose long-axis length is 10 μm or more in an amount of 0.01% by mass or more.

* * * * *